(12) United States Patent
Mulligan

(10) Patent No.: US 8,272,701 B2
(45) Date of Patent: Sep. 25, 2012

(54) TRACK ASSEMBLY WITH SYMMETRIC TRACK CHAIN LINK

(75) Inventor: Patrick J. Mulligan, Dubuque, IA (US)

(73) Assignee: Deere & Company, Moline, IL (US)

( * ) Notice: Subject to any disclaimer, the term of this patent is extended or adjusted under 35 U.S.C. 154(b) by 337 days.

(21) Appl. No.: 12/708,064

(22) Filed: Feb. 18, 2010

(65) Prior Publication Data
US 2011/0198917 A1 Aug. 18, 2011

(51) Int. Cl.
*B62D 55/20* (2006.01)
(52) U.S. Cl. ......... 305/190; 305/186; 305/198; 305/201
(58) Field of Classification Search .................. 305/185, 305/186, 187, 190, 196, 198, 200, 201
See application file for complete search history.

(56) References Cited

U.S. PATENT DOCUMENTS

| | | | | |
|---|---|---|---|---|
| 1,469,001 A | * | 9/1923 | Gentry | 305/202 |
| 1,863,858 A | * | 6/1932 | Knox | 305/59 |
| 2,329,303 A | * | 9/1943 | Stewart | 305/202 |
| 3,416,846 A | * | 12/1968 | Eastman | 305/190 |
| 3,601,454 A | | 8/1971 | Reinsma | |
| 3,606,497 A | | 9/1971 | Gilles | |
| 3,851,931 A | * | 12/1974 | Crisafulli | 305/190 |
| 3,937,530 A | * | 2/1976 | Sturges | 305/190 |
| 3,947,074 A | * | 3/1976 | Nelson | 305/190 |
| 4,058,350 A | * | 11/1977 | Russo | 305/187 |
| 4,098,543 A | * | 7/1978 | Sturges | 305/189 |
| 4,159,857 A | | 7/1979 | Purcell | |
| 4,306,753 A | | 12/1981 | Livesay et al. | |
| 4,423,910 A | | 1/1984 | Narang | |
| 4,818,041 A | | 4/1989 | Oertley | |
| 4,840,438 A | | 6/1989 | Cory | |
| 5,749,635 A | * | 5/1998 | Umbarger | 305/190 |
| 7,219,968 B2 | | 5/2007 | Hisamatsu | |
| 7,614,709 B2 | | 11/2009 | Oertley | |
| 7,657,990 B2 | | 2/2010 | Wodrich et al. | |

FOREIGN PATENT DOCUMENTS

| | | |
|---|---|---|
| EP | 1834863 A1 | 9/2007 |
| EP | 2039596 A1 | 3/2009 |
| JP | 10100956 A | 4/1998 |

OTHER PUBLICATIONS

Dozer Track Chain Images-2 (3 pages)(prior art).
Background Information (2 pages)(prior art).
CASE Extended Life Track Information (1 page)(prior art).
Deere J Dozer Brochure (24 pages)(Oct. 5, 2009).
Tank Track Chain Images (3 pages)(prior art).
Dozer Track Chain Images (3 pages)(prior art).

* cited by examiner

*Primary Examiner* — Kip T Kotter

(57) ABSTRACT

A track chain link for use in an endless track chain has a longitudinal (or "x") dimension and a lateral (or "y") dimension. The track chain link has an x-y plane of symmetry about which the track chain link is symmetric.

15 Claims, 6 Drawing Sheets

TRACK ASSEMBLY WITH SYMMETRIC TRACK CHAIN LINK

FIELD OF THE DISCLOSURE

The present disclosure relates to a track assembly having a symmetric track chain link.

BACKGROUND OF THE DISCLOSURE

Typical track-type vehicles, such as, for example, crawlers and excavators, have an undercarriage comprising wearable components that have a finite life in specific applications. Sprocket segments, rollers, idlers, track chain bushings, and track chain links eventually wear to a point where the part or assemblies have to be replaced. The undercarriage of a crawler, for example, accounts for approximately 35% to 40% of the total operating costs over the life of the crawler. Extending undercarriage life is therefore a great desire of end users, especially in high-wear applications, so as to reduce the cost per hour of running the undercarriage to a competitive level.

In the undercarriage of a typical track-type vehicle, the undercarriage has a number of tracks, one or more of which are located on each side of the vehicle. Each track has an endless track chain and a number of ground-engaging shoes fastened to the chain about the chain periphery. When assembled to the vehicle, the chain is trained in a closed loop about a drive sprocket, an idler, and a number of upper and lower rollers.

The chain has two endless rows of track chain links extending longitudinally of the chain and track chain joints laterally connecting the two rows. The chain is typically sealed and lubricated at the joints. With respect to each row, each joint connects two adjacent links for relative rotation between those links as the chain travels along its longitudinal dimension in its closed-loop path.

Each row includes a plurality of track chain links, master and non-master links. The master link of each row is used to open and close that row of the chain. Other than the master link, the links of each row are configured as non-master links. The shoes are typically mounted to the periphery of the links.

Over time, the chain will become worn. For example, in the case of a fixed-bushing chain, in which the bushing of each track chain joint is fixed to a link in each row, the external wear surface of the bushing may wear on one side due to repeated contact between the bushing and the drive sprocket. In such a case, to extend the life of the chain, the bushings are typically "turned" to present a fresh portion of the bushing external wear surface.

The turning operation involves taking the machine to a shop (e.g., at a dealer) that has a track press, taking the chain completely apart, and rebuilding the chain with the bushings turned 180 degrees so that a fresh portion then engages with the drive sprocket. This process is intensive, expensive, and typically can take between two to three days to accomplish. In addition, as the chain is completely taken apart, the bushing-to-link press-fits can be compromised; some material at the interface may be scored and chain integrity (e.g., the seals) may be jeopardized if the track press operator pushes the chain back together either too violently or not completely enough.

A crawler fitted with a fixed-bushing chain will typically incur some wear depending on its geographical area of operation. It is not uncommon for a larger crawler to obtain between approximately 1200 and 1400 hours of bushing life before the bushings are turned to take advantage of the unworn portion. In addition, repeated contact between the rail surface of each link and, for example, the rollers tends to scallop the rail surface.

A longer life, rotating-bushing chain may also experience wear. In such a chain, the bushings are rotatable, rather than fixed, relative to the links, so the bushings tend to wear less from contact with the drive sprocket and thus last longer than bushings in a fixed-bushing chain. However, repeated contact between the rail surface of each link and, for example, the rollers tends to scallop the rail surface, which eventually calls for replacement of the link.

SUMMARY OF THE DISCLOSURE

According to an aspect of the present disclosure, a track assembly comprises a track chain link, a ground-engaging shoe, and a coupler. The track chain link has a longitudinal (or "x") dimension and a lateral (or "y") dimension.

The track chain link has an x-y plane of symmetry about which the track chain link is symmetric such that the track chain link is invertible relative to the x-y plane of symmetry between a first use orientation and an opposite, second use orientation. The track chain link comprises a peripheral and wearable first rail surface and a peripheral and wearable second rail surface. The first and second rail surfaces extend longitudinally of the track chain link and are positioned to opposite sides of the x-y plane of symmetry.

The coupler attaches the shoe to the track chain link selectively to either side of the x-y plane of symmetry. The coupler comprises a seat separate from the first and second rail surfaces and on which the shoe is mounted in the first and second use orientations of the track chain link. As such, in the event that a rail surface has become uneven through wear, the shoe may be seated properly on the seat rather than the worn rail surface.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
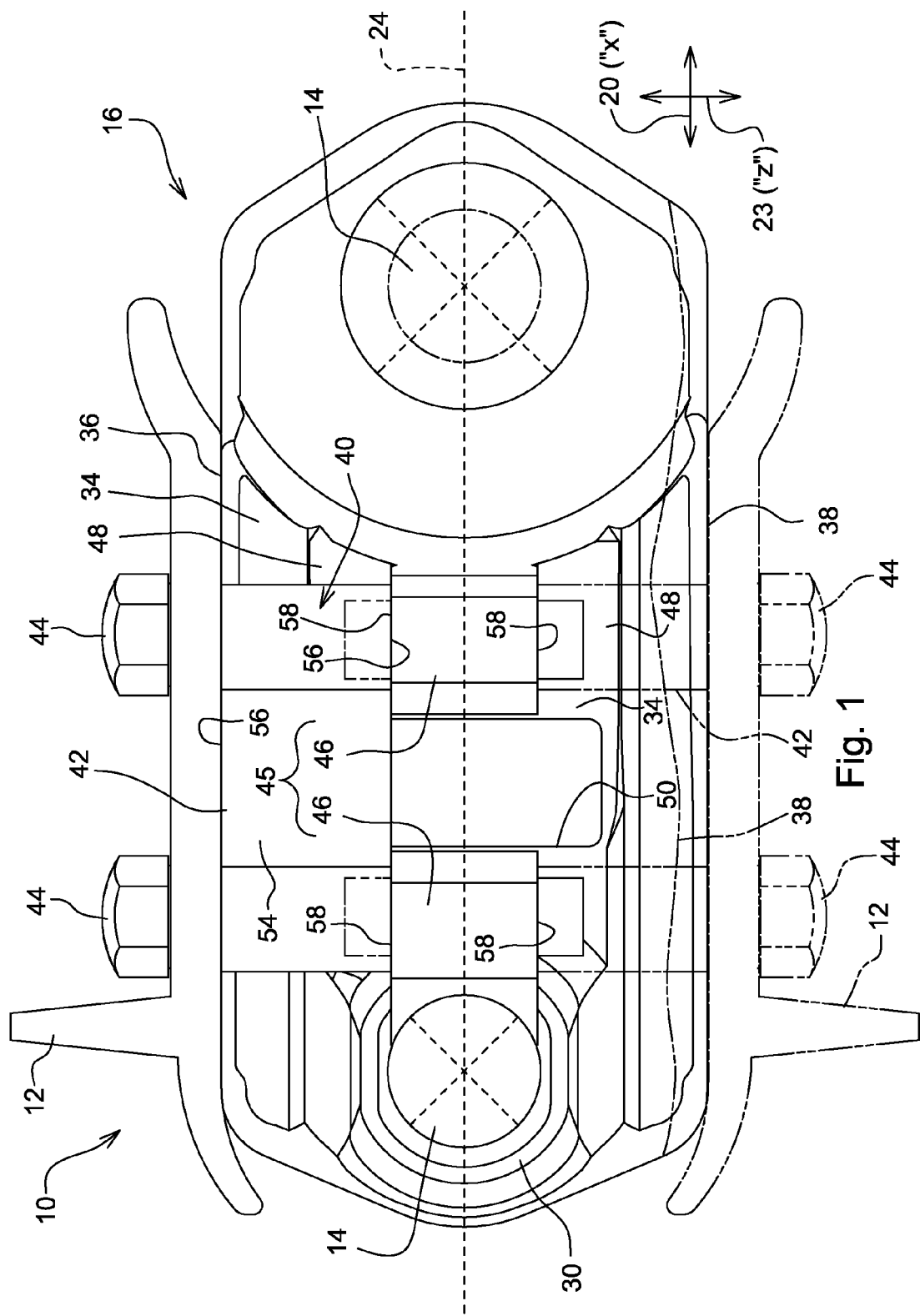
FIG. 1 is a side elevation view of a first track assembly for an endless track chain showing a ground-engaging shoe attached to a symmetric non-master track chain link.
Figure 4:
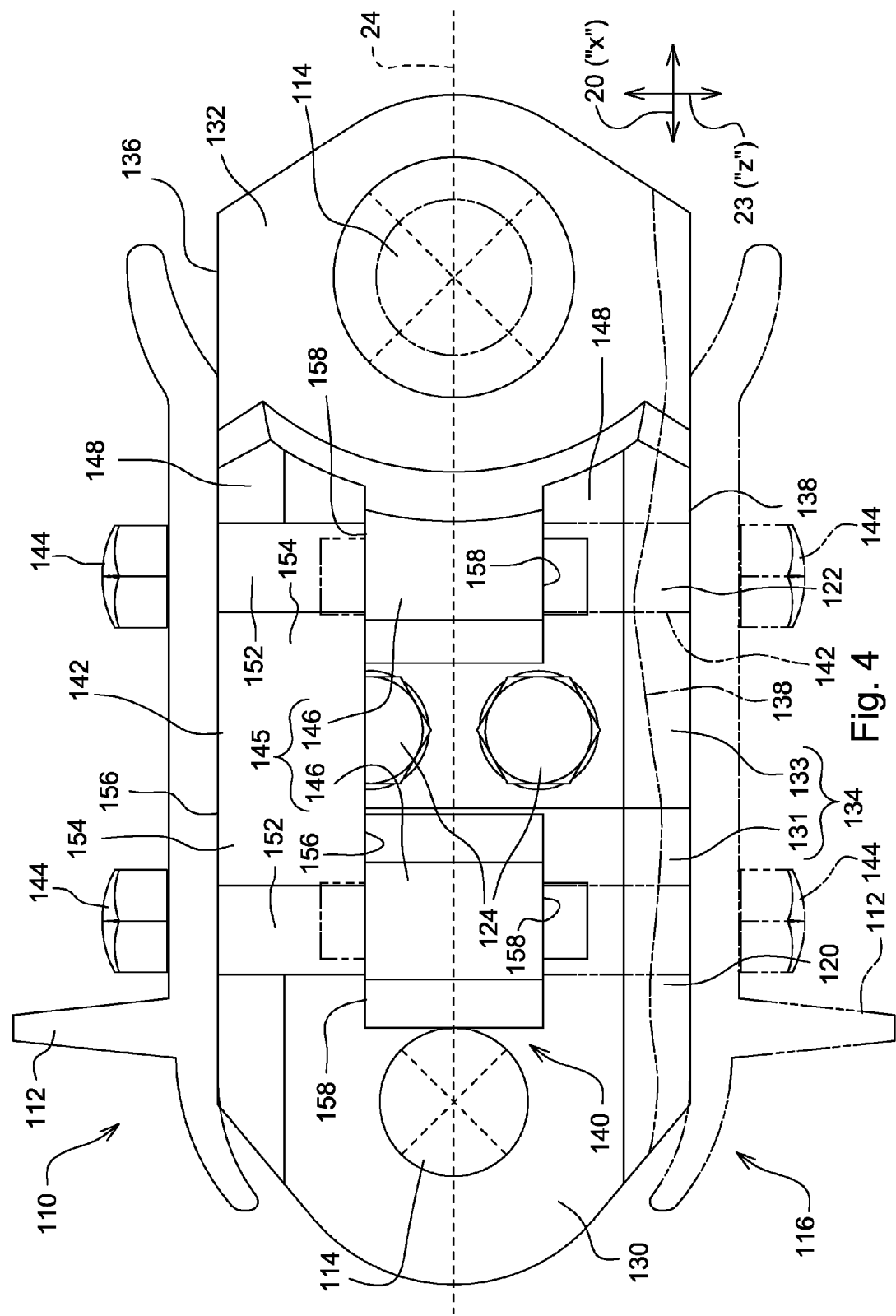
FIG. 4 is a side elevation view of a second track assembly for the endless track chain showing a ground-engaging shoe attached to a symmetric master track chain link.

Track assemblies 10, 110, shown respectively in FIGS. 1 and 4, may be used in a track of a track-type machine such as, for example, a track-type work vehicle. The work vehicle may take the form of, for example, a crawler dozer, a crawler loader, a tracked excavator, a tracked feller buncher, a tracked agricultural machine, or other track-type work vehicle.

The track may have an endless track chain and a number of ground-engaging shoes 12, 112 fastened to the chain about the chain periphery. When assembled to the vehicle, the chain may be trained in a closed loop about a drive sprocket, an idler, and a number of upper and lower rollers.

The chain may have two endless rows of track chain links extending longitudinally of the chain and track chain joints 14 laterally connecting the two rows. The chain may be sealed and lubricated at the joints 14 (the joints 14 represented in FIG. 1 generally with a phantom "X" with the joint on the right side in FIG. 1 showing, in phantom, a pin surrounded by an annular bushing received in and fixed to a link 16). With respect to each row, each joint 14 may connect two adjacent links for relative rotation between those links as the chain travels along its longitudinal dimension in its closed-loop path.

Each row may include a plurality of non-master symmetric track chain links 16 and a master symmetric track chain link 116. The master link 116 may be used to open and close the respective row of the chain. Other than the master link 116, the links of each row may be configured as non-master links 16. Illustratively, the links 16, 116 may be configured for use in a fixed-bushing chain, although they could be configured for use in a rotating-bushing chain or other type of chain.

The shoes 12 may be anchored to the non-master links 16, and the shoe 112 may be anchored to the master links 116, as discussed in more detail herein. The shoes 12 anchored to the non-master links 16 and the shoe 112 anchored to the master links 116 may be similar in configuration, except that the shoe 112 anchored to the master links 116 may have an altered bolting pattern.

Each link 16, 116 may have a longitudinal (or "x") dimension 20 and a lateral (or "y") dimension 22. The longitudinal dimension 20 of the link 16, 116 may correspond to a longitudinal dimension of the chain in that such dimensions are oriented in the same direction. The lateral dimension 22 of the link 16, 116 may correspond to a lateral dimension of the chain in that such dimensions are oriented in the same direction.

The link 16, 116 may have an x-y plane of symmetry 24 about which the link 16, 116 is symmetric (illustratively, bilaterally symmetric). The link 16, 116 may thus be invertible relative to the x-y plane 24 between a first use orientation shown, for example, in solid in respective FIG. 1 or 4 and an opposite, second use orientation shown, for example, in phantom in respective FIG. 1 or 4.

Figure 2A:
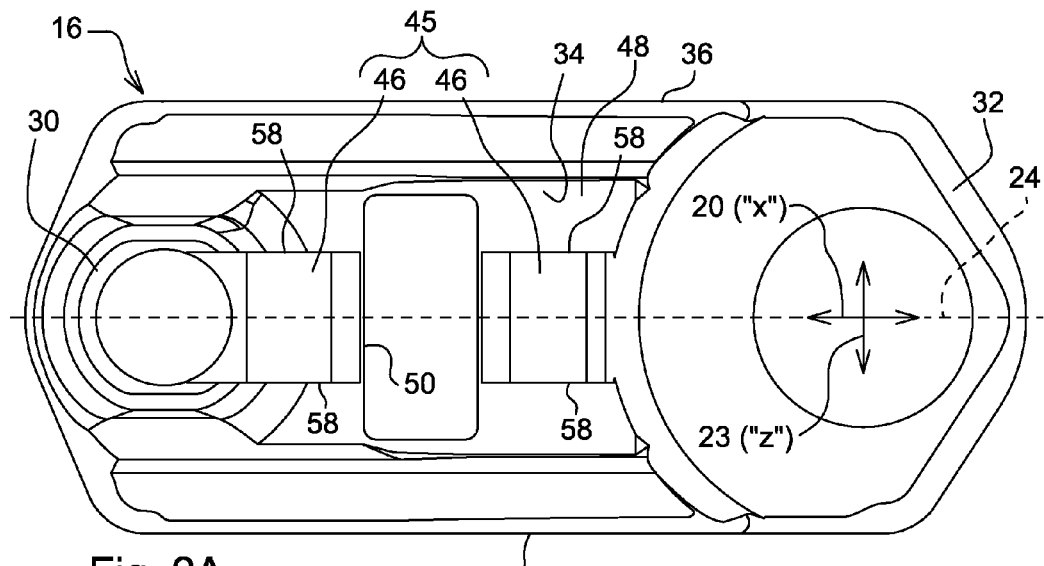
FIG. 2A is a side elevation view of the laterally outward side of the non-master link.
Figure 2B:
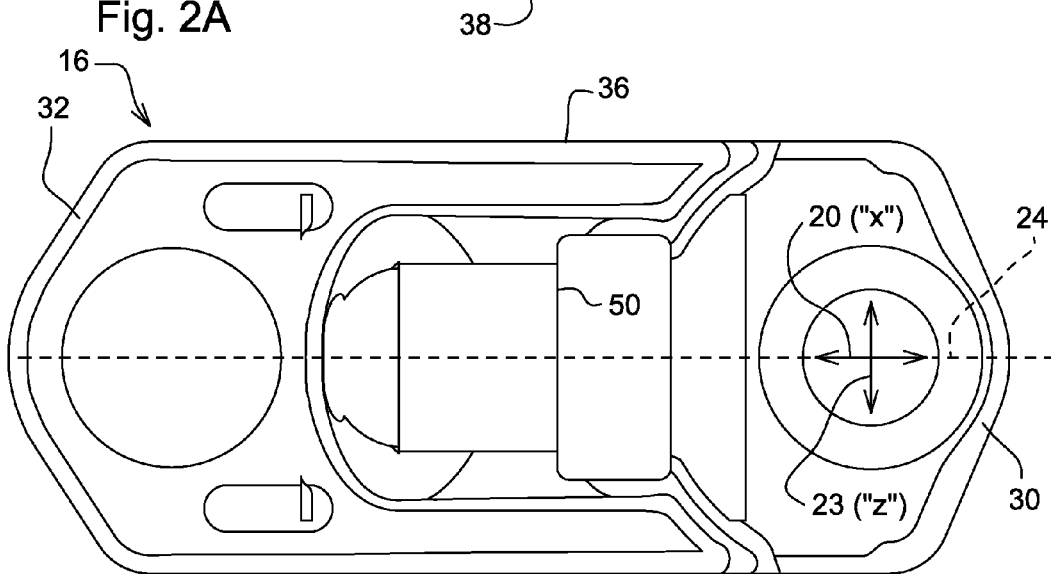
FIG. 2B is a side elevation view of the laterally inward side of the non-master link.
Figure 2C:
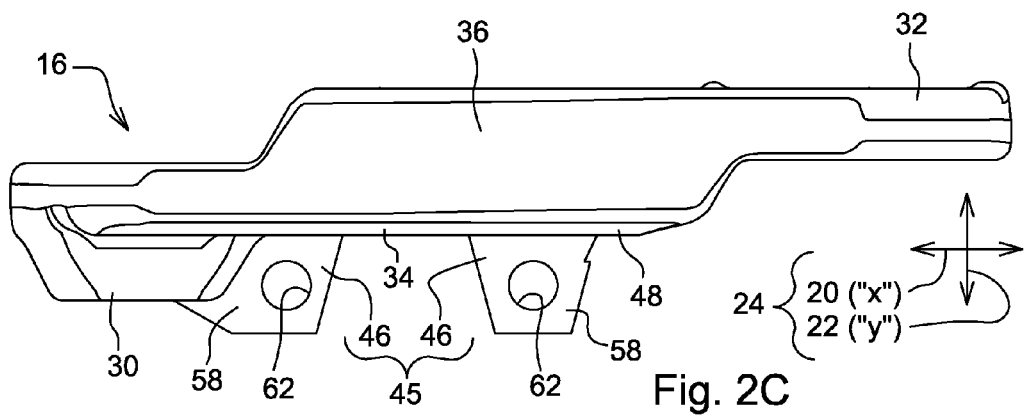
FIG. 2C is a top plan view of the non-master link.

Referring to FIGS. 2A-2C, each non-master link 16 may have a first collar 30, a second collar 32, and a body 34 longitudinally interconnecting the first and second collars 30, 32. Each collar 30, 32 may be configured to receive therein a respective joint 14. The collars 30, 32 may be positioned on the x-y plane 24, and may be offset laterally from one another.

The body 34 may have a longitudinal and peripheral first rail portion, a longitudinal and peripheral second rail portion, and a web interconnecting the rail portions. The rail portions may be positioned on opposite sides of the x-y plane of symmetry 24. Each rail portion may provide a segment of the rail of the respective row, the rail being that portion of the row which contacts the rollers and, in the case of a fixed-bushing chain, the idler.

The first rail portion may have a wearable first rail surface 36 peripheral of the link 16, and the second rail portion may have a wearable second rail surface 38 peripheral of the link 16. The surfaces 36, 38 may be positioned to opposite sides of the x-y plane 24, and may extend longitudinally between the first and second collars 30, 32. The first rail surface 36 may be positioned adjacent to a shoe 12 in the first use orientation and may serve as a segment in the respective rail in the second use orientation. The second rail surface 38 may serve as a segment in the respective rail in the first use orientation and may be positioned adjacent to a shoe 12 in the second use orientation. When serving in the rail, the respective surface 36, 38 may contact the rollers, and may wear over time (e.g., become scalloped). Inversion of the chain, and thus the link 16, presents a fresh surface 36, 38 that is flat and un-scalloped.

A coupler 40 may attach a shoe 12 to the link 16 selectively to either side of the x-y plane of symmetry 24. The coupler 40 may include a seat 42 separate from the first and second rail surfaces 36, 38 and one or more fasteners 44 (e.g., two) fastening removably the shoe 12 to the link 16 via the seat 42.

The shoe 12 may be mounted on the seat 42 in the first and second use orientations of the link 16. The seat 42 may be positioned on an anchor 45 of the link 16 between the anchor 45 and the shoe 12. The anchor 45 may be positioned on the x-y plane of symmetry 24, and the seat 42 may be re-positioned to either side of the anchor 45 to accommodate inversion of the link 16.

The anchor 45 may comprise a pair of bosses 46, both positioned on the x-y plane of symmetry 24. Each boss 46 may protrude laterally from a lateral side wall 48 of the body 34 of the link 16. Such protrusion may occur laterally outwardly relative to the chain for ease of access to each coupler 40 of the track during inversion of the chain and corresponding inversion of the links of the chain. The bosses 46 may be positioned to longitudinally opposite sides of an intervening lateral through-hole 50 formed in the body 34 of the link 16 such that the bosses 46 may be spaced longitudinally apart from one another, the hole 50 provided for laterally outward evacuation of material from within the chain. In other embodiments, the anchor 45 may be configured as a single boss, with corresponding modification of the body 34.

Figure 3A:
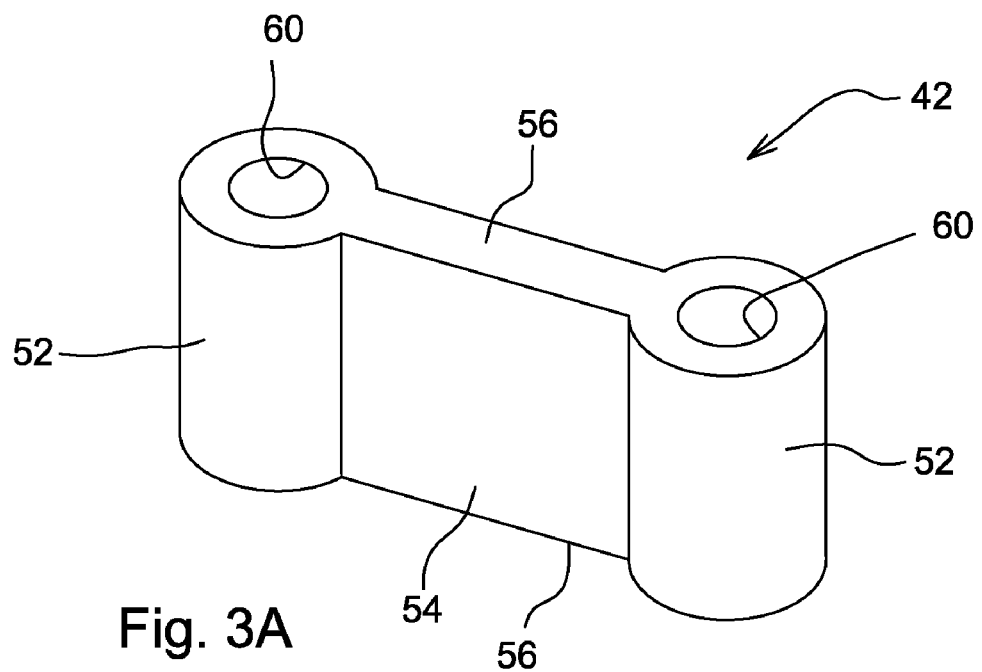
FIG. 3A is a perspective view of a seat of the first track assembly.
Figure 3B:
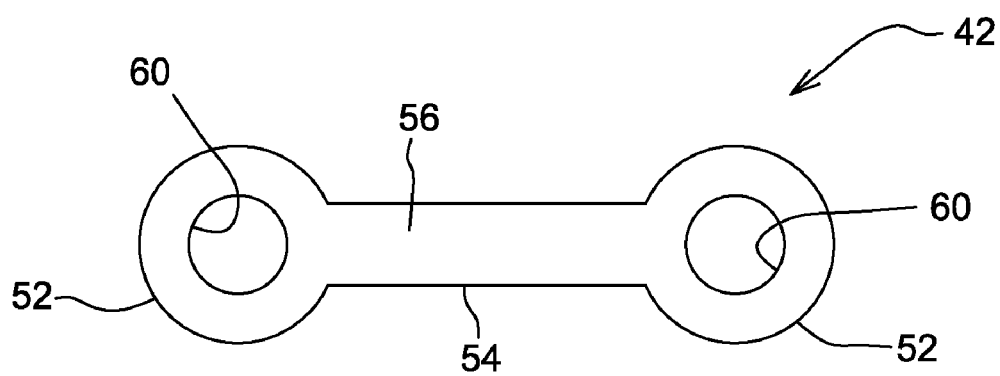
FIG. 3B is a top plan view of a seat of the first track assembly.

Referring to FIGS. 3A and 3B, the seat 42 may include a pair of tubes 52 and a web 54 interconnecting the tubes 52. The tubes 52 and the web 54 may cooperate to provide a pair of flat seat surfaces 56, the surfaces 56 located at opposite ends of the seat 42. The seat 42 may be symmetric, illustratively between its upper and lower halves and between its left and right halves.

Referring back to FIG. 1, the shoe 12 may be attached to the link 16 selectively to either side of the x-y plane of symmetry 24. In so doing, the seat 42 may be positioned between the anchor 45 and the shoe 12, and the fasteners 44 may fasten the shoe 12 to the anchor 45 via the seat 42.

The seat 42 may be positioned on a selected side of the anchor 45, i.e., the same side of the x-y plane 24 to which the shoe 12 is to be positioned. Each tube 52 of the seat 42 may be positioned on a flat ledge 58 of the respective boss 46, each boss 46 having such a ledge 58 on the top and bottom of the boss 46 to accommodate on whichever side of the boss 46 the seat 42 is positioned. As such, a first of the flat seat surfaces 56 may abut the ledges 58 of the bosses 46, located to the same side of the x-y plane of symmetry 24 as the seat 42, in face-to-face contact therewith.

The shoe 12 may be mounted on the other end of the seat 42. In particular, the shoe 12 may be mounted on a second of the flat seat surfaces 56 in face-to-face contact therewith.

The fasteners 44 may extend from the shoe 12 through the seat 42 to the anchor 45. A threaded bolt of each fastener 44 may extend through a respective hole formed in the shoe 12, a bore 60 formed in a respective tube 52 of the seat 42, and a bore 62 formed in a respective boss 46 to the other side of the boss 46 so as to expose a threaded portion of the bolt which receives thereon a nut of the fastener 44 tightened against a respective ledge 58, thereby attaching the shoe to the link 16. The seat 42 may thus provide a load transfer path between the shoe 12 and the link 16 separate from the first and second rail surfaces 36, 38.

When the shoe 12 is attached to the link 16 adjacent to an unscalloped rail surface (e.g., the first orientation shown, for example, in solid in FIG. 1), there may be a slight clearance (e.g., 0.020 inch) between the shoe 12 and that rail surface such that there is a load transfer path between the shoe 12 and the link 16 through the seat 42 but not between the shoe 12 and that rail surface, or the design may call for nominal contact between the shoe 12 and that rail surface with the primary load transfer path still through the seat 42. When the shoe 12 is attached to the link 16 adjacent to a scalloped rail surface (e.g., the second orientation shown, for example, in phantom in FIG. 1), there may be a clearance between the shoe 12 and that rail surface (e.g., ¼ inch or more due to wear) such that there is a load transfer path between the shoe 12 and the link 16 through the seat 42 but not between the shoe 12 and that rail surface.

Figure 5A:
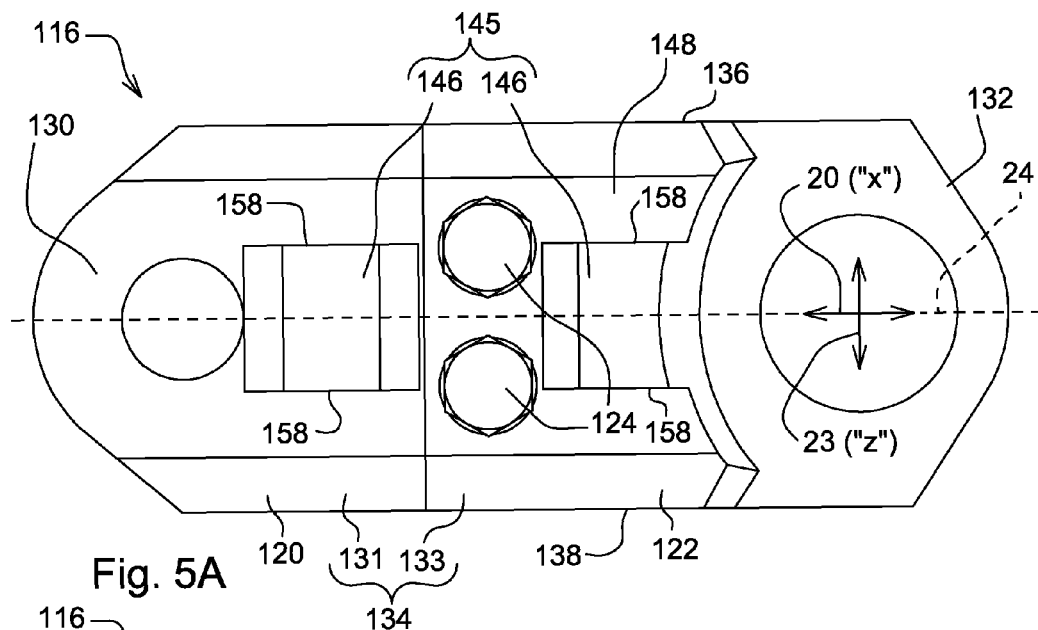
FIG. 5A is a side elevation view of the laterally outward side of the master link.
Figure 5B:
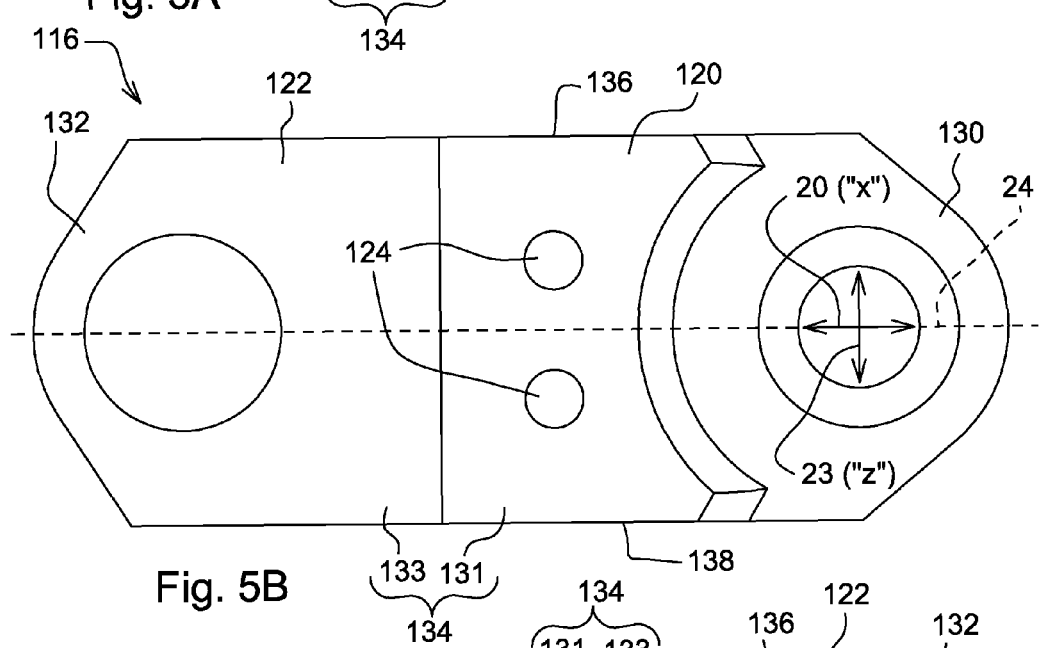
FIG. 5B is a side elevation view of the laterally inward side of the master link.
Figure 5C:
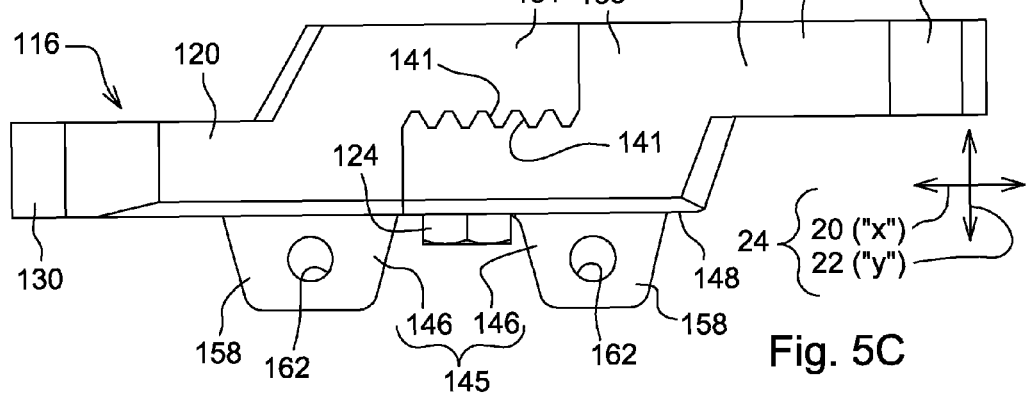
FIG. 5C is a top plan view of the master link.

Referring to FIGS. 5A-5C, the master link 116 may be divided into a first link member 120 and a second link member 122, the link members 120, 122 attached to one another using a pair of fasteners 124 (e.g., capscrews such as illustrated or socket head capscrews which may have a smaller head diameter and may allow more pre-load). Each link member 120, 122 may be symmetric about the x-y plane of symmetry 24 of the link 116.

The first link member 120 may have a first collar 130 of the link 116, and the second link member 122 may have a second collar 132 of the link 116. A body portion 131 of the first link member 120 and a body portion 133 of the second link member 122 may cooperate to provide a body 134 of the link 116 longitudinally interconnecting the first and second collars 130, 132. Each collar 30, 32 may be configured to receive therein a respective joint 14. The collars 30, 32 may be positioned on the x-y plane 24, and may be offset laterally from one another.

The fasteners 124 may fasten the body portions 131, 133 to one another. They may extend laterally through an unthreaded through-hole of the body portion 133 into a threaded through-hole of the body portion 131. The heads of the fasteners 124 may be countersunk slightly into the body portion 133 and may be exposed laterally outward of the link 116 for access thereto to open and close the chain. The fasteners 124 may be positioned relative to one another in a transverse (or "z") dimension 23 of the link 116, the transverse dimension 23 being perpendicular to the longitudinal and lateral dimensions 20, 22.

Figure 7:
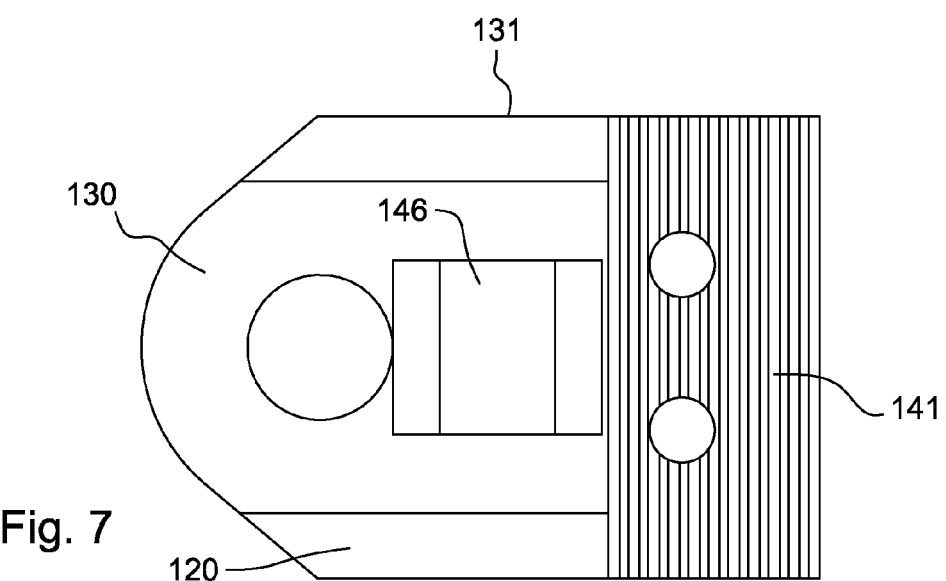
FIG. 7 is a side elevation view showing teeth of a link member of the master link.

Each body portion 131, 133 may have gripper teeth 141. The body portions 131, 133 may overlap one another laterally such that the teeth 141 of the body portions 131, 133 mesh with one another to provide positive locking therebetween. The teeth 141 may extend substantially in the transverse dimension 23 of the body portion 131, 133. The teeth 141 may be straight, as illustrated, for example, with respect to link member 120 in FIG. 7, or curved. Exemplarily, the teeth 141 may take the form of a serrated cut by use of, for example, a common thread profile, ACME thread or curve, or other suitable scheme, conventional or otherwise. In the case of straight teeth, the teeth 141 may extend in the transverse dimension 23 without curvature; in the case of curved teeth, the teeth 13 may extend substantially in the transverse dimension 23, with some extension in the longitudinal dimension 20.

The body portions 131, 133 may cooperate to provide the body 134 with a longitudinal and peripheral first rail portion, a longitudinal and peripheral second rail portion, and a web interconnecting the rail portions. The rail portions may be positioned to opposite sides of the plane 24. Each rail portion may provide a segment of the rail of the respective row.

The first rail portion may have a wearable first rail surface 136 peripheral of the link 116, and the second rail portion may have a wearable second rail surface 138 peripheral of the link 116. The surfaces 136, 138 may be positioned to opposite sides of the plane 24, and may extend longitudinally between the first and second collars 130, 132. The first rail surface 136 may be positioned adjacent to a shoe 112 in the first use orientation and may serve as a segment in the respective rail in the second use orientation. The second rail surface 138 may serve as a segment in the respective rail in the first use orientation and may be positioned adjacent to a shoe 112 in the second use orientation. When serving in the rail, the respective surface 136, 138 may contact the rollers, and may wear over time (e.g., become scalloped). Inversion of the chain, and thus the link 116, presents a fresh surface 136, 138 that is flat and un-scalloped.

A coupler 140 may attach a shoe 112 to the link 116 selectively to either side of the x-y plane of symmetry 24. The coupler 140 may include a seat 142 separate from the first and second rail surfaces 136, 138 and one or more fasteners 144 (e.g., two) fastening removably the shoe 112 to the link 116 via the seat 142.

The shoe 112 may be mounted on the seat 142 in the first and second use orientations of the link 116. The seat 142 may be positioned on an anchor 145 of the link 116 between the anchor 145 and the shoe 112. The anchor 145 may be positioned on the x-y plane of symmetry 24, and the seat 142 may be re-positioned to either side of the anchor 145 to accommodate inversion of the link 116.

The anchor 145 may comprise a pair of bosses 146, both positioned on the x-y plane of symmetry 24. Each boss 146 may protrude laterally from a lateral side wall 148 of the body 134 of the link 16, such wall 148 provided by a lateral side wall of each body portion 131, 133 of each link member 120, 122. Such protrusion may occur laterally outwardly relative to the chain for ease of access to the coupler 140 during inversion of the chain and corresponding inversion of the master link 116. The bosses 146 may be positioned to longitudinally opposite sides of the fasteners 124 such that the bosses 146 may be spaced longitudinally apart from one another.

Figure 6A:
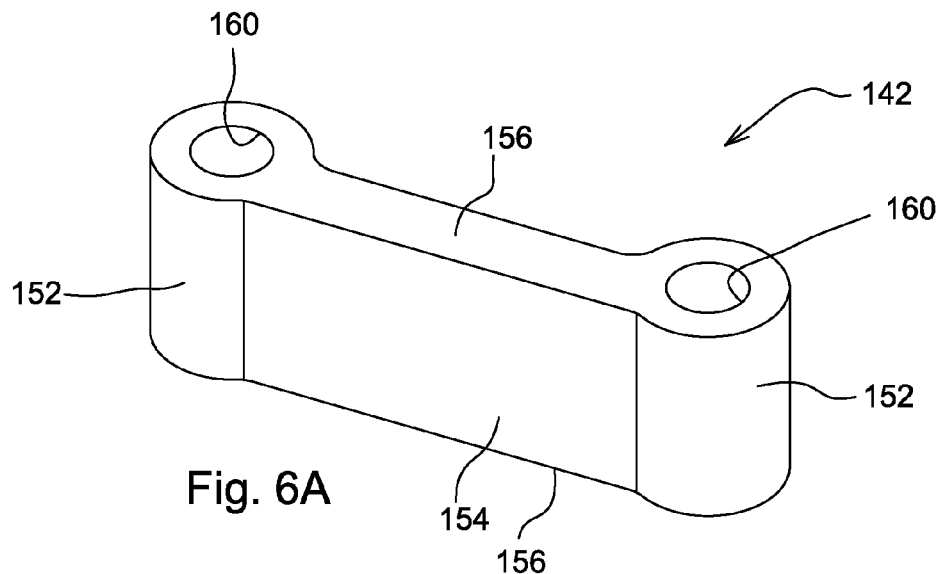
FIG. 6A is a perspective view of a seat of the second track assembly.
Figure 6B:
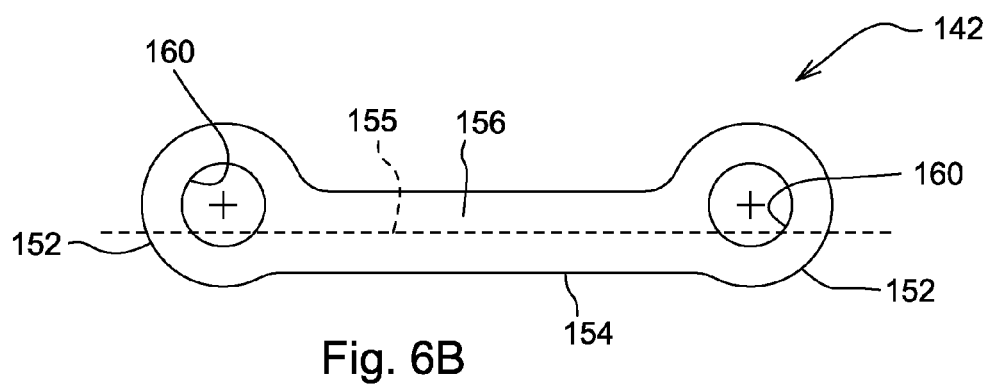
FIG. 6B is a top plan view of a seat of the second track assembly.

Referring to FIGS. 6A and 6B, the seat 142 may include a pair of tubes 152 and a web 154 interconnecting the tubes 152. The tubes 152 and the web 154 may cooperate to provide a pair of flat seat surfaces 156, the surfaces 156 located at opposite ends of the seat 142. The upper and lower halves of the seat 142 mirror one another, as well as the left and right halves. A central plane 155 of the web 154 may be offset from the centers of the tubes 152 to make room for the head of an adjacent fastener 124.

Referring back to FIG. 4, the shoe 112 may be attached to the link 116 selectively to either side of the x-y plane of symmetry 24. In so doing, the seat 142 may be positioned between the anchor 145 and the shoe 112, and the fasteners 144 may fasten the shoe 112 to the anchor 145 via the seat 142.

The seat 142 may be positioned on a selected side of the anchor 45, i.e., the same side of the x-y plane 24 to which the shoe 112 is to be positioned. Each tube 152 of the seat 142 may be positioned on a flat ledge 158 of the respective boss 146, each boss 146 having such a ledge 158 on the top and bottom of the boss 146 to accommodate on whichever side of the boss 146 the seat 142 is positioned. As such, a first of the flat seat surfaces 156 may abut the ledges 158 of the bosses 146, located to the same side of the x-y plane of symmetry 24 as the seat 142, in face-to-face contact therewith.

The shoe 112 may be mounted on the other end of the seat 142. In particular, the shoe 112 may be mounted on a second of the flat seat surfaces 156 in face-to-face contact therewith.

The fasteners 144 may extend from the shoe 12 through the seat 142 to the anchor 145. A threaded bolt of each fastener 144 may extend through a respective hole formed in the shoe 112, a bore 160 formed in a respective tube 152 of the seat 142, and a bore 162 formed in a respective boss 146 to the other side of the boss 146 so as to expose a threaded portion of the bolt which receives thereon a nut of the fastener 144 tightened against a respective ledge 158, thereby attaching the shoe to the link 116. The seat 142 may thus provide a load path between the shoe 112 and the link 116 separate from the first and second rail surfaces 136, 138.

When the shoe 112 is attached to the link 116 adjacent to an unscalloped rail surface (e.g., the first orientation shown, for example, in solid in FIG. 4), there may be a slight clearance (e.g., 0.020 inch) between the shoe 112 and that rail surface such that there is a load transfer path between the shoe 112 and the link 116 through the seat 142 but not between the shoe 112 and that rail surface, or the design may call for nominal contact between the shoe 112 and that rail surface with the primary load transfer path still through the seat 142. When the shoe 112 is attached to the link 116 adjacent to a scalloped rail surface (e.g., the second orientation shown, for example, in phantom in FIG. 4), there may be a clearance between the shoe 112 and that rail surface (e.g., ¼ inch or more due to wear) such that there is a load transfer path between the shoe 112 and the link 116 through the seat 142 but not between the shoe 112 and that rail surface.

The shoes 12, 112 of a track may thus be attached to either side of the chain. In so doing, the seats 42, 142 may provide flat seat surfaces for the shoes, regardless to which side of the chain the shoes are positioned.

Over time, the chain may become worn. For example, in the case of a fixed-bushing chain, the external wear surface of the bushings may wear on one side and the operational rail surface of the links 16, 116 may wear to some extent (e.g., become scalloped), bushing wear being the driving factor for when to invert the chain. In the case of a rotating-bushing chain, the bushings may wear to some extent and the operational rail surface of the links 16, 116 may wear (e.g., become scalloped), rail surface wear being the driving factor for when to invert the chain.

When the chain has become worn, the chain may be inverted. The chain may be opened by disconnecting the master link members 120, 122 of the master link 116 of each row. The chain may then be effectively turned inside out, and, afterwards, re-closed by re-connecting the master link members 120, 122, thereby reconfiguring the chain for further use. During chain inversion, the shoes 12, 112 may be mounted to an opposite side of the chain. With respect to a fixed-bushing chain, chain inversion presents a fresh portion of the external wear surface of the bushings and a fresh rail surface of the links 16, 116. With respect to a rotating-bushing chain, chain inversion presents a fresh rail surface of the links 16, 116.

During chain inversion, the chain may be opened by disconnecting the master link members 120, 122. The fasteners 124 may be removed from the master link 116 of each row to open the chain. The opened chain may be unfolded from the track-type vehicle (which may be lifted off the ground) and laid out on the ground.

At a convenient time in the process, the shoes 12, 112 may be removed from the first side of the chain. This may occur, for example, after the chain has been laid out on the ground, while the chain is still on the vehicle, or some combination thereof which may involve, for example, removing the top half (e.g., about 50-60%) of shoes from the chain while the chain is still on the vehicle (for ease of removal by a technician due to elevation of the top half) and the bottom half of shoes after unfolding the chain from the vehicle onto the ground.

After being laid out on the ground, the chain may be flipped over. Flipping the chain over may be the operative step that effectively turns the chain inside out.

At a convenient time in the process, the shoes 12, 112 may be attached to the opposite side of the chain. This may occur, for example, before or after the chain is flipped over but before the chain is re-mounted to the vehicle, after the chain has been re-mounted to the vehicle 12, or some combination before and after re-mounting to the vehicle 12 such as attaching the bottom half before re-mounting and the top half after re-mounting (for ease of technician due to elevation of top half).

The chain may be re-closed by reconnecting the master link members 120, 122. The fasteners 124 may be re-attached to the master links 116 to reconnect the master link members 120, 122.

During detachment and re-attachment of the shoes 12, 112, the shoes 12, 112 may be re-positioned from a first side of the chain to a second side of the chain. With respect to each non-master link 16, the shoe 12 and the seat 42 are unfastened from the bosses 46 of the anchor 45 of the link 16 upon removal of the fasteners 44 (at least from the bosses 46). The shoe 12 and the seat 42 may be re-positioned to the other side of the link 16 such that the seat 42 is positioned between and in contact with the shoe 12 and the opposite ledges of the bosses 46, after which the bolts are re-inserted and the nuts are threaded back onto the bolts into contact with the ledges of the respective bosses 46, re-attaching the shoe 12 to the anchor 45 of the link 16.

With respect to each master link 116, the shoe 112 and the seat 142 are unfastened from the bosses 146 of the anchor 145 of the link 116 upon removal of the fasteners 144 (at least from the bosses 146). The shoe 112 and the seat 42 may be re-positioned to the other side of the link 116 such that the seat 142 is positioned between and in contact with the shoe 112 and the opposite ledges of the bosses 146, after which the bolts are re-inserted and the nuts are threaded back onto the bolts into contact with the ledges of the respective bosses 146, re-attaching the shoe 112 to the anchor 145 of the link 116.

The links 16, 116 may be made of a conventional material for track chain links. The links 16, 116 may be drop-forged, such as at a temperature near malleability of the material or other suitable temperature. The rail surfaces of the links 16, 116 may be hardened (e.g., heat treated) to a hardness level in the range of 50-55 HRC (Hardness Rockwell C).

The seats 42, 142 may be made of a material similar to the links 16, 116, such as an alloy steel. The seats 42, 142 may be drop-forged, such as at a temperature near malleability of the material or other suitable temperature, or may be extruded and cut to the desired extrusion length (e.g., for high-volume production). The seats 42, 142 may be hardened (e.g., heat treated) (e.g., 40-45 HRC).

The links of the chain may be configured as such symmetric track chain links, including the master and non-master links. As such, upon wear of the track chain, the chain can be effectively turned inside out to present a fresh portion of each bushing (without a bushing-turn operation), as in a fixed-bushing chain, and to present a fresh rail surface of each link (without replacement of the links), as in a fixed-bushing or rotating-bushing chain. Link symmetry may offer one or more of the following benefits: eliminate bushing turn if the concept is applied to a fixed-bushing chain, which may be a substantial cost reduction for customers and eliminate leaks that may develop after taking a chain apart completely; the opportunity to better balance wear of link material if rotating-bushing technology is introduced; introduction of a fresh rail surface that is flat and un-scalloped (for rolling) half-way through the life of modern chains will be an improvement for ride and vibration and will limit scalloping on the links; the utilization of simple, common hand tools in the field without the use of any hydraulic presses (as with a bushing turn operation or a link replacement) and thus without having to take the machine to a maintenance shop (e.g., dealership); and better utilization of the link in that, on a percentage weight basis, more worn material will be used from this design, introducing a "greener" technology.

Further, employment of the seats 42, 142 for mounting of the shoes 12, 112 provides a flat surface 56, 156 on which the shoes 12, 112 can be seated properly regardless whether the rail surface 36, 38, 136, 138 adjacent to which the shoe is mounted has been scalloped. For example, one of the rail surfaces of each link 16, 116 may become scalloped during use prior to chain inversion. With chain inversion, the links 16, 116 are inverted about their planes 24, and the shoes may be re-mounted next to the worn rail surfaces. If a shoe were to be mounted directly onto a worn, scalloped rail surface, the shoe may not seat properly thereon due to the unevenness of such a worn surface and it may be difficult to tighten to the desired torque any fasteners extending through the shoe into the link through the rail worn rail surface. The seats 42, 142 solve that problem by providing a separate place to mount the shoes. As such, the seats 42, 142 may extend slightly (or otherwise) beyond the level of the rail surfaces 36, 38, 136, 138 (e.g., 0.015-0.020 inch—i.e., about the thickness of the paint on the surface).

In other embodiments, the seat 42, 142 may be integrated into the respective link 16, 116, rather than a separate component. For example, with respect to each link 16, 116, there may be two seats 42, 142 for each link 16, 116, one on top of the anchor 45, 145 and one on bottom of the anchor 45, 145 and integral therewith.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A track assembly, comprising:
a track chain link having a longitudinal (or "x") dimension and a lateral (or "y") dimension, the track chain link having an x-y plane of symmetry about which the track chain link is symmetric such that the track chain link is invertible relative to the x-y plane of symmetry between a first use orientation and an opposite, second use orientation, the track chain link comprising a peripheral and wearable first rail surface and a peripheral and wearable second rail surface, the first and second rail surfaces extending longitudinally of the track chain link and positioned to opposite sides of the x-y plane of symmetry,
a ground-engaging shoe, and
a coupler attaching the shoe to the track chain link selectively to either side of the x-y plane of symmetry, the coupler comprising a seat that is mounted on the track chain link and is separate from the first and second rail surfaces and on which the shoe is mounted in the first and second use orientations of the track chain link, wherein the track chain link comprises an anchor positioned on the x-y plane of symmetry, the seat is positioned on the anchor between the anchor and the shoe and is re-positionable between opposite sides of the anchor to accommodate inversion of the track chain link, the coupler comprises a fastener fastening the shoe to the anchor, the anchor comprises a boss that protrudes laterally from a lateral side wall of the track chain link in a lateral direction and receives the fastener such that the fastener fastens the shoe to the boss, the seat is positioned on a ledge of the boss, the fastener is a first fastener, the boss is a first boss, the coupler comprises a second fastener, the anchor comprises a second boss that protrudes laterally from the lateral side wall of the track chain link in the lateral direction and receives the second fastener such that the second fastener fastens the shoe to the second boss, and the seat is positioned on a ledge of the second boss.

2. The track assembly of claim 1, wherein the first fastener extends from the shoe through the seat to the anchor.

3. The track assembly of claim 1, wherein the seat comprises a tube through which the first fastener extends.

4. The track assembly of claim 3, wherein the tube is a first tube, and the seat comprises a second tube through which the second fastener extends.

5. The track assembly of claim 4, wherein the seat comprises a web interconnecting the first and second tubes, and the first and second tubes and the web cooperate to provide a flat seat surface on which the shoe is mounted.

6. The track assembly of claim 1, wherein the shoe is mounted on a flat seat surface of the seat.

7. The track assembly of claim 1, wherein the track chain link is a non-master link.

8. The track assembly of claim 1, wherein the track chain link is a master link.

9. The track assembly of claim 8, wherein the track chain link comprises a first link member and a second link member, and the first and second link members are fastened to one another and overlap one another laterally.

10. The track assembly of claim 1, wherein the seat provides a load path between the shoe and the track chain link separate from the first and second rail surfaces.

11. A track assembly, comprising:
a track chain link having a longitudinal (or "x") dimension and a lateral (or "y") dimension, the track chain link having an x-y plane of symmetry about which the track chain link is symmetric such that the track chain link is invertible relative to the x-y plane of symmetry between a first use orientation and an opposite, second use orientation, the track chain link comprising a peripheral and wearable first rail surface and a peripheral and wearable second rail surface, the first and second rail surfaces extending longitudinally of the track chain link and positioned to opposite sides of the x-y plane of symmetry, a ground-engaging shoe, and a coupler attaching the shoe to the track chain link selectively to either side of the x-y plane of symmetry, the coupler comprising a seat that is mounted on the track chain link and is separate from the first and second rail surfaces and on which the shoe is mounted in the first and second use orientations of the track chain link, wherein the track chain link comprises an anchor positioned on the x-y plane of symmetry, and the seat is positioned on the anchor between the anchor and the shoe and is re-positionable between opposite sides of the anchor to accommodate inversion of the track chain link, the coupler comprises a fastener fastening the shoe to the anchor, the anchor comprises a boss that protrudes laterally from a lateral side wall of the track chain link and receives the fastener such that the fastener fastens the shoe to the boss, the seat is positioned on a ledge of the boss, the fastener is a first fastener, the boss is a first boss, the coupler comprises a second fastener, the anchor comprises a second boss that protrudes laterally from the lateral side wall of the track chain link and receives the second fastener such that the second fastener fastens the shoe to the second boss, the seat is positioned on a ledge of the second boss, and the seat comprises a first tube receiving the first fastener, a second tube receiving the second fastener, and a web interconnecting the first and second tubes, and the first and second tubes and the web cooperate to provide a flat seat surface on which the shoe is mounted.

12. A track assembly, comprising:

a track chain link having a longitudinal (or "x") dimension and a lateral (or "y") dimension, the track chain link having an x-y plane of symmetry about which the track chain link is symmetric such that the track chain link is invertible relative to the x-y plane of symmetry between a first use orientation and an opposite, second use orientation, the track chain link comprising a peripheral and wearable first rail surface and a peripheral and wearable second rail surface, the first and second rail surfaces extending longitudinally of the track chain link and positioned to opposite sides of the x-y plane of symmetry, a ground-engaging shoe, and a coupler attaching the shoe to the track chain link selectively to either side of the x-y plane of symmetry, the coupler comprising a seat that is mounted on the track chain link and is separate from the first and second rail surfaces and on which the shoe is mounted in the first and second use orientations of the track chain link, wherein the track chain link comprises an anchor positioned on the x-y plane of symmetry, and the seat is positioned on the anchor between the anchor and the shoe and is re-positionable between opposite sides of the anchor to accommodate inversion of the track chain link, the coupler comprises a fastener fastening the shoe to the anchor, the anchor comprises a boss that protrudes laterally from a lateral side wall of the track chain link and receives the fastener such that the fastener fastens the shoe to the boss, the seat is positioned on a ledge of the boss, the fastener is a first fastener, the boss is a first boss, the coupler comprises a second fastener, the anchor comprises a second boss that protrudes laterally from the lateral side wall of the track chain link and receives the second fastener such that the second fastener fastens the shoe to the second boss, the seat is positioned on a ledge of the second boss, the track chain link comprises a lateral through-hole, and the first and second bosses are positioned on longitudinally opposite sides of the lateral through-hole.

13. A track assembly, comprising:

a track chain link having a longitudinal (or "x") dimension and a lateral (or "y") dimension, the track chain link having an x-y plane of symmetry about which the track chain link is symmetric such that the track chain link is invertible relative to the x-y plane of symmetry between a first use orientation and an opposite, second use orientation, the track chain link comprising a peripheral and wearable first rail surface and a peripheral and wearable second rail surface, the first and second rail surfaces extending longitudinally of the track chain link and positioned to opposite sides of the x-y plane of symmetry, a ground-engaging shoe, and a coupler attaching the shoe to the track chain link selectively to either side of the x-y plane of symmetry, the coupler comprising a seat that is mounted on the track chain link and is separate from the first and second rail surfaces and on which the shoe is mounted in the first and second use orientations of the track chain link, wherein the track chain link comprises a first collar, a second collar, a body interconnecting the first collar and the second collar, a first boss, and a second boss, the first and second bosses protrude laterally from a lateral side wall of the body and are positioned on the x-y plane of symmetry, the seat comprises a first tube positioned on the first boss, a second tube positioned on the second boss, and a web interconnecting the first and second bosses, the coupler comprises a first fastener and a second fastener, the first fastener extends from the shoe through the first tube to the first boss, and the second fastener extends from the shoe through the second tube to the second boss.

14. The track assembly of claim 13, wherein the track chain link is a non-master link, and the first and second bosses are spaced longitudinally apart from one another by an intervening lateral through-hole of the track chain link.

15. The track assembly of claim 13, wherein the track chain link is a master link comprising a first link member, a second link member, and a fastener fastening the first and second link members to one another such that portions of the first and second link members overlap one another laterally, the first boss protrudes laterally from the first link member, and the second boss protrudes laterally from the second link member.

* * * * *